(12) United States Patent
Zhang et al.

(10) Patent No.: US 10,494,296 B2
(45) Date of Patent: Dec. 3, 2019

(54) GLASS COMPOSITION AND METHOD OF MANUFACTURING THE SAME, AND GLASS MEMBER AND IMAGE PICKUP DEVICE

(71) Applicant: CANON KABUSHIKI KAISHA, Tokyo (JP)

(72) Inventors: Zuyi Zhang, Yokohama (JP); Yoshinori Kotani, Yokohama (JP); Naoyuki Koketsu, Komae (JP)

(73) Assignee: CANON KABUSHIKI KAISHA, Tokyo (JP)

(*) Notice: Subject to any disclaimer, the term of this patent is extended or adjusted under 35 U.S.C. 154(b) by 366 days.

(21) Appl. No.: 15/316,472

(22) PCT Filed: Jul. 22, 2015

(86) PCT No.: PCT/JP2015/003680
§ 371 (c)(1),
(2) Date: Dec. 5, 2016

(87) PCT Pub. No.: WO2016/017118
PCT Pub. Date: Feb. 4, 2016

(65) Prior Publication Data
US 2017/0190613 A1 Jul. 6, 2017

(30) Foreign Application Priority Data

Jul. 29, 2014 (JP) .................. 2014-153917

(51) Int. Cl.
| | | |
|---|---|---|
| $C03C$ $23/00$ | (2006.01) |
| $C03C$ $3/06$ | (2006.01) |
| $C03C$ $3/085$ | (2006.01) |
| $C03C$ $4/08$ | (2006.01) |
| $C03C$ $17/02$ | (2006.01) |
| $G02B$ $5/20$ | (2006.01) |
| $G02B$ $5/22$ | (2006.01) |

(52) U.S. Cl.
CPC ............ $C03C$ $23/0095$ (2013.01); $C03C$ $3/06$ (2013.01); $C03C$ $3/085$ (2013.01); $C03C$ $4/082$ (2013.01); $C03C$ $17/02$ (2013.01); $G02B$ $5/208$ (2013.01); $G02B$ $5/226$ (2013.01); $C03C$ $2217/425$ (2013.01); $C03C$ $2218/32$ (2013.01)

(58) Field of Classification Search
CPC ......... C03C 3/083; C03C 3/085; C03C 3/087; C03C 3/097; C03C 3/076; C03C 3/61; C03C 23/0095
See application file for complete search history.

(56) References Cited

U.S. PATENT DOCUMENTS

| | | | |
|---|---|---|---|
| 5,627,113 A * | 5/1997 | Debnath ................... | C03C 3/06 252/301.4 R |
| 6,342,460 B1 | 1/2002 | Akimoto et al. | |
| 6,903,036 B2 | 6/2005 | Akimoto et al. | |
| 9,278,882 B2 | 3/2016 | Takashima et al. | |
| 9,487,436 B2 | 11/2016 | Koketsu et al. | |
| 2002/0072461 A1 | 6/2002 | Akimoto et al. | |
| 2006/0037366 A1* | 2/2006 | Chen ......................... | C03C 3/06 65/399 |
| 2006/0201200 A1* | 9/2006 | Akai ......................... | C03C 3/06 65/30.1 |
| 2013/0045853 A1 | 2/2013 | Kotani et al. | |
| 2013/0068725 A1 | 3/2013 | Takashima et al. | |
| 2014/0293114 A1* | 10/2014 | Koketsu ................. | C03C 17/02 348/335 |

FOREIGN PATENT DOCUMENTS

| | | |
|---|---|---|
| JP | 7-61835 A | 3/1995 |
| JP | 2000-313636 A | 11/2000 |
| JP | 2010-53013 A | 3/2010 |
| JP | 2013-126937 A | 6/2013 |

* cited by examiner

*Primary Examiner* — Elizabeth A. Bolden
(74) *Attorney, Agent, or Firm* — Venable LLP

(57) ABSTRACT

Provided is a glass composition having an infrared absorbing function, water resistance, heat resistance, and a low expansion coefficient, the glass composition including the following components (a) to (c): (a) 0.1 wt % or more to 14.0 wt % or less of an intermediate oxide; (b) 0.1 wt % or more to 14.0 wt % or less of CuO; and (c) 80.0 wt % or more to 99.8 wt % or less of silica, in which a total of a content ratio of the intermediate oxide and a content ratio of the CuO is from 0.2 wt % or more to 20 wt % or less.

12 Claims, 1 Drawing Sheet

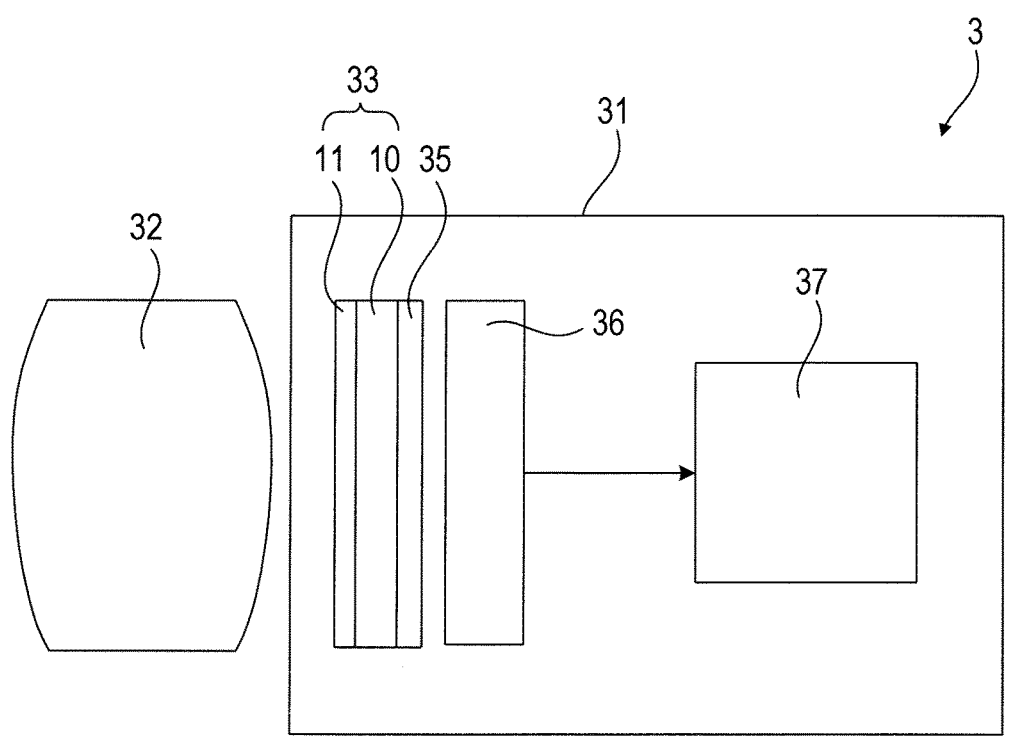

GLASS COMPOSITION AND METHOD OF MANUFACTURING THE SAME, AND GLASS MEMBER AND IMAGE PICKUP DEVICE

TECHNICAL FIELD

The present invention relates to a glass composition and a method of manufacturing the same, and a glass member and an image pickup device.

BACKGROUND ART

For the purpose of adjusting a light amount in an infrared region or cutting an entire light amount in the region, infrared absorbing glass has hitherto been used. A $Cu^{2+}$ component in the infrared absorbing glass is involved in an infrared absorption principle of the glass. Specifically, absorption in an infrared region caused by d-d transition of a $Cu^{2+}$ ion is utilized. In general, fluorophosphate-based glass is used as such infrared absorbing glass, but the fluorophosphate-based glass has a problem of low water resistance making handling difficult.

Meanwhile, in use of the infrared absorbing glass, the glass itself becomes hot in response to an amount of absorbed light particularly in the case where condensed light needs to be absorbed by the glass or where the glass is exposed to light including an absorption component for a long time period. In the glass that has absorbed light or has been exposed to light, a temperature difference of about from 100° C. to 200° C. easily arises in an object in some cases. For this reason, for example, in the case where a thin film such as an anti-reflection film is provided on a surface of the infrared absorbing glass, an internal stress is often generated between the thin film and a substrate. When the stress is concentrated at an interface between the thin film and the substrate, the thin film (an optical deposition film such as an anti-reflection film) is liable to be peeled off or cracked.

In addition, in the case of an oscillatory optical member, it is also considered that the optical member is liable to be broken when the above-mentioned internal stress is applied in addition to an external stress accompanied by oscillation. In view of the foregoing, the glass to be used is required to have resistance to temperature changes in addition to heat resistance particularly in an application in which intense light is locally absorbed.

To cope with the problems, for example, PTL 1 proposes infrared absorbing glass that is constructed of silica, copper oxide, and a network modified oxide and is aimed at improving durability of the infrared absorbing glass.

Although the infrared absorbing glass of PTL 1 has an infrared absorption ability, its heat resistance and durability are still insufficient owing to a system in which the network modified oxide is introduced in a network structure formed of silica.

CITATION LIST

Patent Literature

[PTL 1] Japanese Patent Application Laid-Open No. 2000-313636
[PTL 2] Japanese Patent Application Laid-Open No. 2013-126937

SUMMARY OF INVENTION

Solution to Problem

According to one embodiment of the present invention, there is provided a glass composition, including the following components (a) to (c):
(a) 0.1 wt % or more to 14.0 wt % or less of an intermediate oxide;
(b) 0.1 wt % or more to 14.0 wt % or less of CuO; and
(c) 80.0 wt % or more to 99.8 wt % or less of silica,
in which a total of a content ratio of the intermediate oxide and a content ratio of the CuO is from 0.2 wt % or more to 20 wt % or less.

Further features of the present invention will become apparent from the following description of exemplary embodiments with reference to the attached drawing.

BRIEF DESCRIPTION OF DRAWINGS

FIG. 1 is a schematic sectional view for illustrating an example of an image pickup device in which an optical member including a glass composition film of the present invention is installed.

DESCRIPTION OF EMBODIMENTS

Preferred embodiments of the present invention will now be described in detail in accordance with the accompanying drawing.

The present invention has been made in view of the problems described above, and an object of the present invention is to provide a glass composition having an infrared absorbing function, water resistance, heat resistance, and a low expansion coefficient.
(Glass Composition)
A glass composition of the present invention includes the following components (a) to (c).
(a) 0.1 wt % or more to 14.0 wt % or less of an intermediate oxide;
(b) 0.1 wt % or more to 14.0 wt % or less of CuO; and
(c) 80.0 wt % or more to 99.8 wt % or less of silica ($SiO_2$).
It should be noted that, in the present invention, the total of the content ratio of the intermediate oxide and the content ratio of CuO is from 0.2 wt % or more to 20 wt % or less. In addition, the glass composition of the present invention is a glass composition for absorbing mainly infrared rays.

The glass composition of the present invention is a glass material that contains as its components the intermediate oxide, CuO, and silica, and absorbs infrared rays. The glass composition of the present invention forms an amorphous structure as with conventional glass. Specifically, the glass composition of the present invention forms a structure based on a three-dimensional network formed of Si—O bonds of silica, into part of which CuO and the intermediate oxide are incorporated as modified oxides.

Meanwhile, when merely CuO is tried to be incorporated into the three-dimensional network based on silica, CuO cannot be successfully incorporated. However, when the intermediate oxide is introduced into silica together with CuO, CuO can be incorporated into the three-dimensional network based on silica. As a result, a homogeneous three-dimensional network structure based on silica into which CuO is further incorporated is realized. In this case, also a metal ion derived from the intermediate oxide enters the network as part of its constituent components. With this, CuO can be distributed in the three-dimensional network based on silica together with the intermediate oxide.

It should be noted that, in the present invention, the specific shape of the glass composition is not particularly limited, but there are given, for example, a plate shape having a constant thickness (thickness of at least submillimeter order), a lens shape, and a gob shape. Of those, a plate shape is preferred.

Next, the constituent components of the glass composition of the present invention are described.

(1) Silica ($SiO_2$)

The glass composition of the present invention contains 80.0 wt % or more to 99.8 wt % or less of silica as one of the components. When a skeleton for forming the glass composition contains 80.0 wt % or more of silica, the glass composition achieves heatresistant temperature resembling that of silica glass. In addition, regarding thermal expansion, a property leaning toward a silica glass side is exhibited. While the heatresistant temperature and expansion coefficient of the glass composition of the present invention vary depending on the content ratio of CuO in the composition, the heatresistant temperature of the composition itself can be set to 700° C. or more when the content ratio of silica is 80.0 wt % or more. Therefore, the glass composition of the present invention has a $T_g$ of 200° C. or more higher than that of fluorophosphate glass. In addition, the expansion coefficient of the glass composition of the present invention can be suppressed to $50 \times 10^{-7}$/° C. or less, which is at least ½ or less of that of the fluorophosphate glass. Further, the glass composition forms a three-dimensional skeleton by forming the network based on silica as described above, and hence shows excellent mechanical properties including strength. In the case where heatresistant temperature at a higher level is further demanded in the glass composition of the present invention depending on its application, it is appropriate to further increase the content ratio of silica in the glass composition. Specifically, the heatresistant temperature is further improved by adjusting the content ratio of silica to 85.0 wt % or more. In addition, the content ratio of silica may be set to 90.0 wt % or more as required in accordance with a thermal process to which the glass composition of the present invention is exposed. In the case where the content ratio of silica is 90.0 wt % or more, the glass composition of the present invention can be used for an infrared absorbing glass member capable of responding to a thermal process of 900° C. or more.

(2) Intermediate Oxide

The intermediate oxide to be contained in the glass composition of the present invention is a metal oxide containing a metal ion having a valence of 3, 4, or 5 in an oxide state and a Shannon's ionic radius of 0.7 Å or less (preferably 0.6 Å or less). Specific examples thereof include $Al_2O_3$, $TiO_2$, $Ga_2O_3$, and $Ta_2O_5$. Of those, $Al_2O_3$ is preferred.

The intermediate oxide to be contained in the glass composition of the present invention is an essential component basically for realizing the homogeneity of CuO with silica (incorporation of CuO into the network based on silica). Herein, when the glass composition is tried to be produced by using only silica and the intermediate oxide, the homogeneity of the intermediate oxide with silica is not satisfactory, that is, the intermediate oxide cannot be successfully incorporated into the network based on silica in some cases. The intermediate oxide is also an essential component basically for controlling the dispersibility of CuO and a ligand field of CuO in the network based on silica.

In the present invention, the content ratio of the intermediate oxide is from 0.1 wt % or more to 14.0 wt % or less, more preferably from 0.2 wt % or more to 12.0 wt % or less. When the content ratio of the intermediate oxide exceeds 14.0 wt %, the components of CuO and silica are relatively reduced, and there is a risk in that any performance of absorption characteristics and heat resistance is impaired in the glass composition.

In addition, the glass composition of the present invention preferably satisfies the following formula (1) between the intermediate oxide and CuO.

$$0.2 \leq n_1/n_2 \leq 5.0 \qquad (1)$$

(In the formula (1), $n_1$ represents the molar amount of the intermediate oxide, and $n_2$ represents the molar amount of CuO.)

Herein, in the case where the ratio $n_1/n_2$ is less than 0.2, that is, the content ratio of CuO is too high in the glass composition, the homogeneity of CuO with silica becomes poor, and the absorption characteristics of $Cu^{2+}$ are deteriorated. The resultant glass tends to be blackened. In contrast, in the case where the ratio $n_1/n_2$ exceeds 5.0, there is a risk in that homogeneous glass is not obtained owing to the intermediate oxide affecting a ligand field structure of CuO and being contained beyond an upper limit for the compatibility with silica. The ratio $n_1/n_2$ is more preferably set to from 0.5 or more to 3.0 or less in order to control the ligand field around a $Cu^{2+}$ ion and realize the homogeneity of glass.

In the glass composition of the present invention, it is presumed that the intermediate oxide is an alternative to Si contained in the three-dimensional network structure based on silica. In addition, the intermediate oxide exists in a form located around Cu and adjacent to Cu. Therefore, the intermediate oxide improves the compatibility of CuO with silica, and as well, can control the ligand field of $Cu^{2+}$ depending on the metal valence or ionic radius. In the present invention, it is preferred to use $Al_2O_3$ as the intermediate oxide.

In addition, in the present invention, the intermediate oxide may be used in one kind or two or more kinds. Herein, in the case of using two or more kinds of intermediate oxides, the content ratio of the intermediate oxide in the glass composition means the total content ratio of the intermediate oxides of all kinds, and $n_1$ in the formula (1) represents the total molar amount of the intermediate oxides of all kinds.

(3) CuO

In the glass composition of the present invention, CuO is a component that absorbs infrared rays. The content ratio of CuO with respect to the entire composition is from 0.1 wt % or more to 14.0 wt % or less, preferably from 0.3 wt % to 14.0 wt %. When the content ratio of CuO is less than 0.1 wt %, an infrared absorption ability is low, and infrared absorption efficiency is not satisfactory. In contrast, when the content ratio of CuO exceeds 14.0 wt %, there is a risk in that the heat resistance of the glass composition is impaired.

In addition, in the present invention, the total of the content ratio of the intermediate oxide and the content ratio of CuO is from 0.2 wt % or more to 20.0 wt % or less, preferably from 1.0 wt % or more to 18.0 wt % or less. The total of the content ratio of the intermediate oxide and the content ratio of CuO is determined from the viewpoints of the control of the dispersibility of CuO and the ligand field of CuO in the glass composition, and the absorption characteristics and heat resistance of the glass composition.

(Method of Manufacturing Glass Composition)

A method of manufacturing the glass composition of the present invention is not particularly limited, and any melt-forming method involving heating and melting a raw material in a powder form having a high melting point as compared to general multi-component glass is adopted. In the case of the melting, the raw material is melted at a temperature approximately three times as high as its heat-resistant temperature.

Alternatively, a method involving densification through porous silica may be adopted. In the present invention, the method involving densification is more preferred. It is preferred that the glass composition be manufactured by a firing method (the densification method) through porous silica also from the viewpoint of optical properties, because a formation temperature set to a higher temperature side causes a remarkable reduction tendency of $Cu^{2+}$.

In the case of firing a porous body formed of the constituent components of the glass composition, energy for making the porous body non-porous is basically covered with high surface energy of the porous body. Herein, in the case where the constituent components are entirely aggregate of particles of micrometer order, the aggregate cannot efficiently be made non-porous through heating at low temperature owing to low sinterability between the particles. Accordingly, the porous body to be made non-porous has such a precondition that the porous body necessarily contains a highly reactive constituent component even when the porous body includes a region of micrometer order (for example, a void region or a matrix region). As a silica-based porous body that can be made non-porous in a temperature range of 1,500° C. or less without performing a melting method, a porous body formed by combusting a vapor phase gas, a porous body derived from a liquid phase method, or a silica-based porous body obtained by phase separation and etching of glass is conveniently used.

In the case of forming the porous body by a method involving combusting a vapor phase gas, for example, any method involving appropriately depositing an oxide may be used. Herein, a specific method of depositing an oxide is not particularly limited, but for example, a vapor phase method such as VAD may be adopted.

In the case of forming the porous body by the method involving combusting a vapor phase gas, a specific procedure is as follows: a mixed gas prepared by mixing raw materials such as $SiCl_4$, $AlCl_3$, $GaCl_3$, $TiCl_4$, and $CuCl_2$ at appropriate ratios is combusted by using a hydrogen burner; and thereby, the porous body (soot) is formed. It should be noted that, in the case of producing the porous body formed of metal oxides by adopting such method, there is no need to limit the raw materials to chlorides, and any material that is combusted to be converted into an oxide through a decomposition and oxidation reaction may be used instead of the chloride. Herein, an alternative to the chloride is not particularly limited unless a problem arises in its reactivity with a hydrogen component to be used in the hydrogen burner. Specifically, there may be used a halide except for a chloride (a fluoride, a bromide, or an iodide) of a metal, a metal alkoxide, or other sublimable compounds of β-diketone, or other organic complexes. In each case, there is no need to supply the entirety of the raw materials for the oxides at one time, and the constituent components may separately be supplied each time.

Alternatively, the porous body formed of the constituent components of the glass composition may be formed by a liquid phase method. Specifically, complex salts such as metal alkoxides (such as a silicon alkoxide, an aluminum alkoxide, a gallium alkoxide, a copper alkoxide, and a titanium alkoxide) are hydrolyzed to form oxides in a gel form. In the formation of the gel, reaction conditions such as a water content and temperature are appropriately controlled in order to control the reactivity of the raw materials. Besides, the reactivity of the raw materials may appropriately be controlled by adding a chelating agent of a diketone such as acetylacetone. In addition, it is preferred to use a desirable acid catalyst in accordance with the reactivity of the raw materials in order to control a hydrolysis reaction of the metal alkoxides and a condensation polymerization reaction between metal hydroxides generated through the hydrolysis reaction. In the case of promoting polymerization, a base catalyst such as ammonia may be used. There is no need to limit all the above-mentioned reaction conditions, and the conditions may conveniently be set depending on the raw materials to be used, the concentrations of the raw materials in a liquid, the amount of water required for the hydrolysis, and an addition method.

Raw materials for oxides (CuO and the intermediate oxide) may be added to a gel material formed from the hydrolysis reaction of the metal alkoxides through the condensation polymerization reaction between the metal hydroxides. Specifically, reactive oxide particles serving as part of the raw materials and each having a particle diameter of 200 nm or less may be mixed in the gel material. In addition, the oxide porous body may be obtained by adding an ammonia aqueous solution to an aqueous solution of nitrates or chlorides that may be converted into the oxides to form a gel material formed of the oxides or hydroxides.

Further, as the oxide porous body to be used in the production of the glass composition of the present invention, one obtained by firing a silica porous body after metal oxides are introduced into the porous body may be used. As the silica porous body, there may conveniently be used the soot obtained by the above-mentioned combustion method, the porous body obtained by the liquid phase method, and as well, porous silica obtained from spinodal phase separation borosilicate glass.

The phase separation glass is obtained by, for example, a method described below. Specifically, in general, homogeneous glass is separated into a silica glass phase and a borate glass phase through heat treatment in a phase separation temperature range. The glass separated into the two phases is etched with an acid aqueous solution, and thereby spinodal phase separation-type porous silica from which the borate glass phase is removed is obtained. In this case, phase separation glass having a porous structure and having a pore diameter falling within a range of from nm to 100 nm is easily formed depending on the composition of the glass or the phase separation conditions. Porous silica obtained from the phase separation glass is then impregnated with an aqueous solution (impregnation liquid) containing metal ions such as $Al^{3+}$, $Ti^{4+}$ ($TiO^{2+}$), $Cu^{2+}$, $Ga^{3+}$, and $Ta^{5+}$, followed by drying. Thus, the porous body for firing is obtained. As the aqueous solution to be used at this time, any aqueous solution that is dissolved in water may basically be used with no problem as a raw material. As a compound to be contained in the aqueous solution (impregnation liquid), there is specifically given $Al(NO_3)_3$, $Cu(NO_3)_2$, $Ga(NO_3)_3$, $Ta(NO_3)_5$, $AlCl_3$, $CuCl_2$, $TiOCl_2$, and $GaCl_3$, and also hydrates thereof are conveniently used. When porous silica is immersed in the aqueous solution, components contained in the aqueous solution are precipitated in pores in the drying stage. The porous body for firing is obtained by drying porous silica, which has been dried as described above, at a temperature of 900° C. or less to decompose part or the whole of the compounds depending on the compounds. In the case of producing the porous body for firing by an impregnation method as described above, for the purpose of adjusting the concentrations of the components in porous silica, porous silica may be impregnated several number of times, or a process of decomposing and oxidizing the impregnated components may be conducted on the way. With this, the proper compositional deposition realizes a desirable glass composition.

A step of firing the porous body for firing (firing step) is basically a step of making the porous body for firing non-porous. A process of making the porous body for firing non-porous depends on the surface area of the porous body. In the present invention, in the process of making the porous body for firing non-porous, the surface area of the porous body for firing is preferably from 10 $m^2/g$ or more to less than 500 $m^2/g$. When the surface area is less than 10 $m^2/g$, surface energy contributing to making the porous body for firing non-porous is low, and a transparent silica-based glass composition tends to be hardly obtained. In contrast, when the surface area is 500 $m^2/g$ or more, there is a remarkable tendency that the porous body for firing is liable to be broken owing to a weak skeleton and high water absorbability, and it becomes difficult to handle the porous body.

In the firing step, a firing temperature is appropriately determined depending on the state and composition of the porous body, but preferably falls within a range of from 800° C. to 1,500° C. When the firing temperature is less than 800° C., a speed of making the porous body non-porous becomes low, and a silica-based glass composition of high quality is not obtained. In contrast, when the firing temperature exceeds 1,500° C., glass itself is softened, and hence it becomes difficult to maintain the shape of the glass composition to be obtained.

The glass composition of the present invention realizes an infrared absorbing function by a copper component in the composition being in an oxidized state of $Cu^{2+}$. Therefore, in the case where the copper component is in a reduced state of, for example, a Cu metal until the firing step is performed, a step of oxidizing the copper component may separately be performed. A preferred method for oxidation treatment of the copper component involves firing (provisional firing) in a temperature range of from 500° C. or more to the firing temperature or less in an $O_2$-containing atmosphere. As the firing atmosphere, there may appropriately be used pure air, air, a mixed gas of oxygen and nitrogen. It should be noted that this firing (provisional firing) stage is performed under the conditions in which glass itself does not proceed with firing. When the firing is performed in a temperature range close to the firing temperature, glass itself proceeds with sintering in an area that oxygen diffusion or the like does not reach, and the copper component may remain in a reduced state.

(Application of Glass Composition)

For example, the glass composition of the present invention can be utilized as a base material constituting a $Cu^{2+}$-containing glass substrate including the base material and a porous glass film for covering the surface of the base material as a surface layer. In the $Cu^{2+}$-containing silica substrate, a porous silica surface layer may be formed on the base material by forming a phase separation glass film on the surface of the $Cu^{2+}$-containing substrate, and performing treatment such as etching on the phase separation glass film. It should be noted that, regarding a method of forming the porous glass film, the porous glass film may be formed by, for example, a method disclosed in PTL 2. According to PTL 2, a porous silica film is formed on the base material as described below. A phase separable glass powder-containing paste is used to be formed into a film on the base material by a film formation method such as a printing method or a bar coating method. The paste film formed into a film is then planarized through levelling at from 100° C. to 200° C. After that, a resin component in the paste film is decomposed through heating at from 300° C. to 600° C., and then heating is further performed in a temperature range of from 800° C. to 1,100° C., to form the phase separation glass film on the base material. After that, the phase separation glass film is subjected to phase separation in a temperature range of from 500° C. to 650° C. over a period of from several hours to several days. As just described, when the phase separation glass film is exposed to high temperature conditions for a long time period, boric acid volatilizes from the surface layer, and, a silica-rich surface layer arises on the outermost surface. A phase separation structure may be exposed by removing the silica-rich outermost surface by a polishing method or an etching method, which allows for a state in which a phase separation glass phase can be etched. Subsequently, a borate glass phase in phase separation glass is removed by etching through impregnation with an acid aqueous solution. Thus, the surface layer formed of phase separation porous silica is formed. As described above, by making the surface porous, a low refractive index can be achieved on the surface, and the reflectance on the surface can be controlled to from 0.5% to 1%. With this, anti-reflection performance can be added to the $Cu^{2+}$-containing silica substrate. Regarding a specific construction of the film exhibiting an anti-reflection function as described above, the porous silica film serving as a surface layer has a refractive index of preferably 1.2 or less, more preferably 1.18 or less. In order to obtain such film having a low refractive index, the porosity of the porous silica film is preferably 50% or more.

Further, in the case of producing the $Cu^{2+}$-containing silica substrate by the method disclosed in PTL 2, a gradient structure formed of porous silica having a depth of 50 nm or more exists at an interface between the porous silica film and the base material in the obtained substrate. With the gradient structure, reflection of light that may be caused at the interface between the porous silica film and the base material is suppressed, and such anti-reflection function as to achieve a reflectance of the entire $Cu^{2+}$-containing silica substrate of 1% or less can be imparted. In the case of producing the $Cu^{2+}$-containing silica substrate of the present invention, a borosilicate-based phase separation glass film can be provided on any substrate (base material) that has heatresistant temperature of 800° C. or more, more preferably 900° C. or more. This is because when the substrate (base material) itself has heatresistant temperature of 800° C. or more, the substrate is less deformed and surface precision required for optical applications can be maintained during the firing of the phase separation glass film provided on the substrate (base material).

Such $Cu^{2+}$-containing silica substrate including the porous silica film as a surface layer has a function of reducing an adhesion force to dirt or dust in addition to the infrared absorbing function exhibited by the base material and the anti-reflection function. By applying a surface property of having the function of reducing an adhesion force to dirt or the like, the $Cu^{2+}$-containing silica substrate can be utilized as an optical member also excellent in dust-proof function. In general, a gap of several nanometers to several tens of nanometers exists in the vicinity of an interface to be brought into contact with dirt owing to the smoothness of the surface itself, water is condensed in the gap depending on the humidity of the air, and a liquid bridge is generated owing to the condensed water. A suction force applied to dirt on the surface is said to be increased owing to the liquid bridge. Accordingly, by forming a layer having a porous silica structure as the surface layer of the substrate, the suction force caused by the condensed water resulting from moisture in the air is significantly reduced, resulting in excellent dust-proof characteristics. As described above, any surface formed of a porous silica film basically exhibits dust-proof performance, while the specific structure of the porous glass film having an excellent dust-proof property on the surface has not yet been specified.

Regarding optical characteristics, the porous silica film has a property of showing more remarkable optical scattering as the scale of pores constituting the porous silica film becomes larger. Based on the fact, the porous silica film has a pore diameter of preferably 50 nm or less. Such porous structure having a pore diameter controlled to a smaller value, which is formed by a high temperature process, exhibits constant strength in spite of a high porosity, and hence can be conveniently used as an optical member.

FIG. 1 is a schematic cross-sectional view for illustrating an example of an image pickup device in which a glass member is mounted. It should be noted that an image pickup device 3 of FIG. 1 is a camera, specifically, an image pickup device configured to form a subject image from a lens 32 on an image pickup element 36 through an optical member 33. The image pickup device 3 of FIG. 1 includes a main body 31 and a removable lens 32. In a case where the image pickup device 3 of FIG. 1 is an image pickup device such as a digital single-lens reflex camera, imaging screens different in angle of field can be obtained by exchanging the photographing lens (lens 32) to be used in photographing with lenses having different focal lengths. The main body 31 forming the image pickup device 3 of FIG. 1 includes the image pickup element 36, a low pass filter 35, and the optical member 33. The optical member 33 herein includes a base material 10 having a function of an infrared cut filter and a surface layer 11. The glass composition of the present invention is used as the base material 10, and the surface layer 11 is formed of a porous glass film.

In the optical member 33 (glass member), the glass composition serving as the base material 10 is arranged on the image pickup element 36 side and the porous glass film serving as the surface layer 11 is arranged on the lens 32 side. That is, the optical member 33 is arranged so that the surface layer 11 is farther from the image pickup element 36 than the base material 10.

The image pickup element 36 forming the image pickup device 3 of FIG. 1 is accommodated in a package (not shown), and the package holds the image pickup element 36 in a sealed state by a cover glass (not shown). Further, the image pickup element 36 is connected to an image processing circuit 37, and information on an image imaged by the image pickup element 36 is converted into data by the image processing circuit 37. It should be noted that a CMOS element or a CCD element can be used as the image pickup element 36.

In addition, a sealing structure (not shown) is provided between an optical filter such as the low pass filter 35 and the cover glass (not shown) by means of a sealing member. It should be noted that an example including both an infrared cut filter (optical member 33) and the low pass filter 35 as the optical filters is illustrated in FIG. 1, but any one of the components may be omitted.

EXAMPLE 1

(1) Production of Glass Composition

In Example 1, porous glass obtained from phase separation borosilicate glass was prepared as porous silica. It should be noted that the porous glass has a porosity of about 50% (apparent density: 1.1 g/cm$^3$), a pore diameter of 30 nm, and a thickness of 1 mm. In addition, in Example 1, an aqueous solution of 3.3% Cu(NO$_3$)$_2$.3H$_2$O and 4.9% AlCl$_3$.6H$_2$O was used as sources for CuO and Al$_2$O$_3$. It should be noted that the aqueous solution is referred to as impregnation liquid in the following description.

First, the silica porous body was immersed in the impregnation liquid, retained for 10 minutes, and then taken out therefrom, and an extra impregnation liquid remaining on the surface was blown away with an air gun. After that, the silica porous body was dried in the air for 2 hours. Next, the silica porous body was heated at a temperature increasing rate of 10° C./min to 600° C., and retained at 600° C. for 10 minutes. After that, the silica porous body was left to cool once. Thus, a silica porous body for firing containing CuO and Al$_2$O$_3$ was obtained. After that, the silica porous body for firing was heated to 1,050° C. in a stepwise fashion and then heated at 1,100° C. for 10 hours, to be made non-porous. Thus, a Cu$^{2+}$-containing silica glass 1 having a plate shape (glass composition) was obtained. It should be noted that the silica glass had a composition of 0.5 wt % of CuO, 0.5 wt % of Al$_2$O$_3$, and 99.0 wt % of SiO$_2$, had a molar ratio between Cu and Al of Cu:Al=1:1.6, and had a ratio n$_1$/n$_2$ of 0.8. In addition, the total of the content ratio of CuO and the content ratio of Al$_2$O$_3$ serving as the intermediate oxide was 1.0 wt %.

By using part of the obtained glass composition, the glass composition was evaluated for water resistance in accordance with a water resistance evaluation method for optical glass (powder method). As a result, it was confirmed that an elution amount was 0.02% or less, and the glass composition had first-grade water resistance. In addition, the obtained glass composition was evaluated for an expansion coefficient in a temperature range of from 50° C. to 250° C. with a TMA. As a result, it was confirmed that an elongation amount was small and the expansion coefficient was at least 50×10$^{-7}$/° C. or less, while there was an oscillation error.

(2) Production of Glass Substrate

A part of the glass composition produced in the section (1), specifically a portion of 1.6 cm square (1.6 cm×1.6 cm) was cut out, and both surfaces thereof were subjected to mirror polishing. Thus, a Cu$^{2+}$-containing silica base material having a thickness of 0.5 mm (hereinafter referred to simply as base material) was obtained.

Next, a phase separable glass paste containing SiO$_2$, B$_2$O$_3$, Al$_2$O$_3$, and Na$_2$O was formed into a film by being printed on one surface of the base material. It should be noted that the composition of the phase separable glass paste is as described below.

SiO$_2$: 63 wt %$^{(Note)}$
B$_2$O$_3$: 27 wt %$^{(Note)}$
Al$_2$O$_3$: 3 wt %$^{(Note)}$
Na$_2$O: 7 wt %$^{(Note)}$ ((Note) Weight ratio in the case where the total amount of SiO$_2$, B$_2$O$_3$, Al$_2$O$_3$, and Na$_2$O is defined as 100 wt %)

Next, the base material was heated and dried at 100° C. Next, the base material was heated to 400° C. in an oxygen atmosphere to remove a binder from the printed film, and then heated at 1,000° C. for 10 minutes to planarize the film (glass film). Next, the base material having the film (glass film) formed thereon was cooled once, and then retained at 580° C. for 50 hours to perform phase separation of the film. Next, the surface of the film was subjected to mirror polishing, and then etched at 80° C. for 15 hours by using 1

N nitric acid, rinsed with pure water, and dried in the air. Thus, a glass substrate ($Cu^{2+}$-containing silica glass substrate) including the porous glass film was obtained.

The base material was visually observed. As a result, it was confirmed that the base material itself was less deformed, and the base material ($Cu^{2+}$-containing silica glass substrate) had excellent heat resistance. The glass substrate was measured for an absorption spectrum with a spectrophotometer. As a result, absorption by $Cu^{2+}$ (760 nm) was confirmed. The reflectance on the surface on which the film was formed was measured to be about 0.8% with a surface reflectometer, and it was confirmed that the produced glass substrate also had excellent anti-reflection performance. In addition, the surface on which the film was formed was observed with a SEM. As a result, it was confirmed that the film serving as a surface layer had a spinodal phase separation silica structure having a pore diameter of about 15 nm.

EXAMPLE 2

First, the silica porous body prepared in Example 1 was immersed in the impregnation liquid prepared in Example 1, retained for 10 minutes, and then taken out therefrom, and an extra impregnation liquid remaining on the surface was blown away with an air gun. After that, the silica porous body was dried for 2 hours in the air. It should be noted that, in Example 2, the operation of impregnation and drying was performed five times. Next, the silica porous body was subjected to heat treatment by the same method as in Example 1. Thus, a $Cu^{2+}$-containing silica glass 2 (glass composition) having a greenish color and a plate shape was obtained. It should be noted that the silica glass had a composition of 2.0 wt % of CuO, 1.9 wt % of $Al_2O_3$, and 96.1 wt % of $SiO_2$, had a molar ratio between Cu and Al of Cu:Al=1:1.5, and had a ratio $n_1/n_2$ of 0.7. In addition, the total of the content ratio of CuO and the content ratio of $Al_2O_3$ serving as the intermediate oxide was 3.9 wt %.

Next, a glass substrate including a porous glass film was produced by the same method as in Example 1. In the production of the glass substrate, the glass composition of Example 2 serving as a base material was heated to 1,000° C., but no deformation was observed. Therefore, it was confirmed that the glass composition of Example 2 had heatresistant temperature of about 1,000° C.

COMPARATIVE EXAMPLE 1

A glass composition was obtained by the same method as in Example 1 except that, in Example 1, an aqueous solution of 3.3% $Cu(NO_3)_2 \cdot 3H_2O$ was used as an impregnation liquid instead of the impregnation liquid used in Example 1. However, the obtained sample was blackened, and silica-based glass having an infrared absorbing function was not obtained.

INDUSTRIAL APPLICABILITY

The glass composition of the present invention can be applied as an infrared light intensity adjusting member or window glass of an electric furnace or the like. In addition, the glass composition of the present invention can be used for an application as a video sensor by utilizing sensitive absorption of infrared rays. In addition, the glass substrate of the present invention is constructed of the surface layer formed of porous silica and the heat-resistant base material for absorbing infrared rays, and hence exhibits an optical anti-reflection function and a dust-proof function by virtue of performance of reducing an adhesion force to dirt, as well as an infrared light absorbing function. Accordingly, the glass substrate of the present invention can be utilized as a member of an optical material.

As described above by way of the embodiments and Examples, according to the embodiments of the present invention, it is possible to provide the glass composition having an infrared absorbing function, water resistance, heat resistance, and a low expansion coefficient.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-153917, filed Jul. 29, 2014, which is hereby incorporated by reference herein in its entirety.

The invention claimed is:

1. A glass composition, comprising:
   (a) 0.1 wt % to 14.0 wt % of at least one intermediate oxide;
   (b) 0.1 wt % to 14.0 wt % of CuO; and
   (c) 80.0 wt % to 99.8 wt % of silica,
   wherein the at least one intermediate oxide is a metal oxide containing a metal ion having a valence of 3, 4, or 5 in an oxide state and a Shannon's ionic radius of 0.7 Å or less, and
   wherein a total amount of the at least one intermediate oxide and CuO is from 0.2 wt % to 20 wt %.

2. The glass composition according to claim 1, which comprises 85.0 wt % or more of the silica.

3. The glass composition according to claim 1, wherein the glass composition satisfies formula (1):

$$0.2 \leq n_1/n_2 \leq 5.0 \qquad (1),$$

where $n_1$ represents a molar amount of the at least one intermediate oxide, and $n_2$ represents a molar amount of CuO.

4. The glass composition according to claim 1, wherein the at least one intermediate oxide is selected form the group consisting of $Al_2O_3$, $TiO_2$, $Ga_2O_3$, and $Ta_2O_5$.

5. The glass composition according to claim 1, which comprises at least two intermediate oxides.

6. The glass composition according to claim 1, wherein the total amount of the at least one intermediate oxide and CuO is from 0.2 wt % to 3.9 wt %.

7. The glass composition according to claim 1, wherein the total amount of the at least one intermediate oxide and CuO is from 1.0 wt % to 3.9 wt %.

8. The glass composition according to claim 1, wherein the glass composition comprises:
   (a) 0.5 wt % to 1.9 wt % of the at least one intermediate oxide;
   (b) 0.5 wt % to 2.0 wt % of CuO; and
   (c) 96.1 wt % to 99.0 wt % of the silica.

9. A method of manufacturing the glass composition of claim 1, the method comprising:
   firing porous silica containing CuO and the at least one intermediate oxide at a temperature of 900° C. or more.

10. A glass member, comprising:
    a base material; and
    a surface layer for covering a surface of the base material,
    wherein the base material comprises the glass composition of claim 1, and
    wherein the surface layer comprises a porous silica film.

11. An image pickup device, comprising:
the glass member of claim 10; and
an image pickup element,
wherein the glass member is arranged so that the surface layer is farther from the image pickup element than the base material.

12. An image pickup device, comprising:
the glass composition of claim 1; and
an image pickup element.

* * * * *